Figure 1:
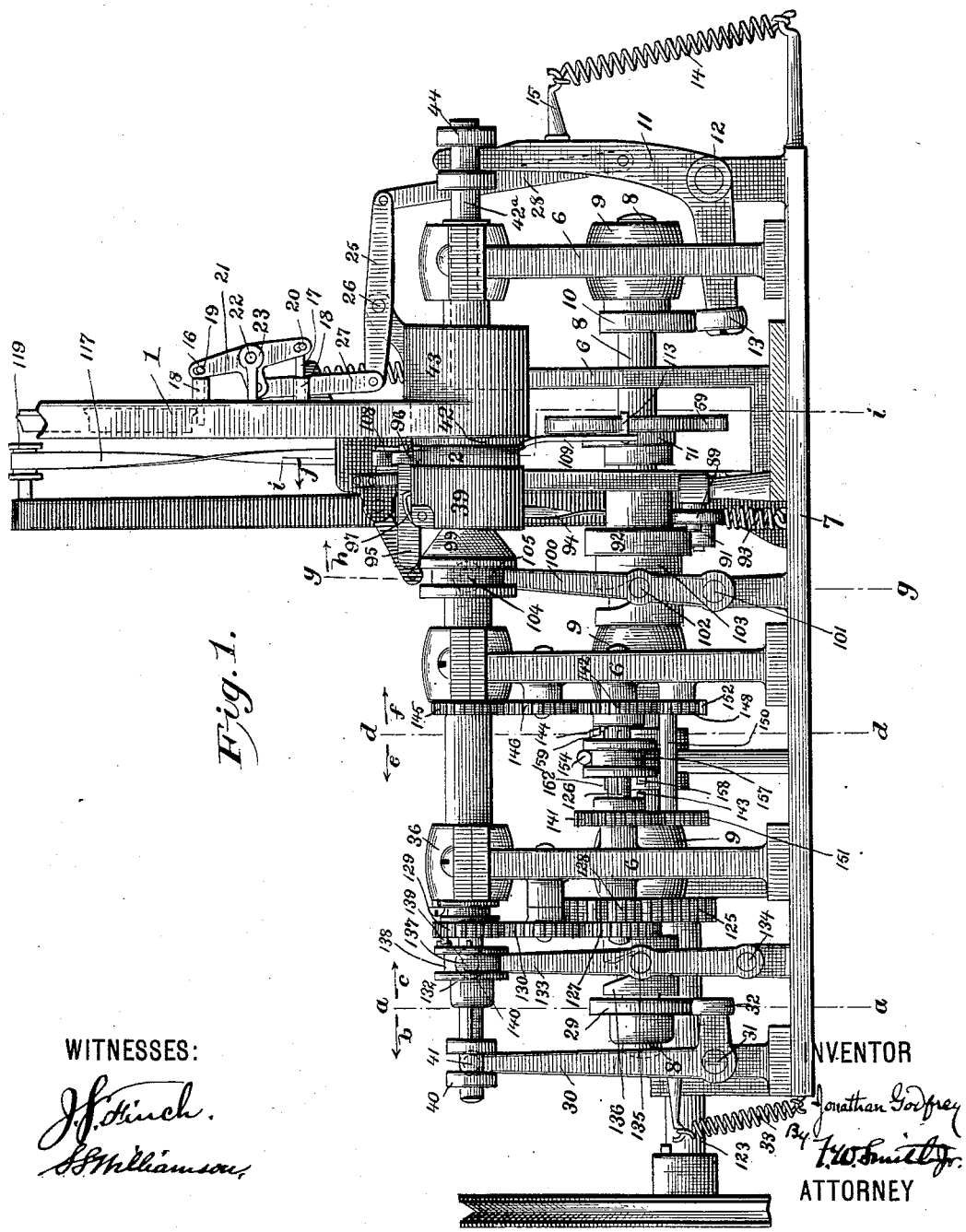

(No Model.) 8 Sheets—Sheet 1.

J. GODFREY.
MACHINE FOR STRIPPING PASTE OR STRAW BOARD BOXES.

No. 475,552. Patented May 24, 1892.

WITNESSES:
J. F. Finch.
S. S. Williamson.

INVENTOR
Jonathan Godfrey
By T. W. Smith Jr.
ATTORNEY (No Model.) 8 Sheets—Sheet 2.

J. GODFREY.
MACHINE FOR STRIPPING PASTE OR STRAW BOARD BOXES.

No. 475,552. Patented May 24, 1892.

WITNESSES:
J.F. Finch.
J.S. Williamson

INVENTOR
Jonathan Godfrey
BY
F.W. Smith Jr.
ATTORNEY (No Model.)  
8 Sheets—Sheet 4.

J. GODFREY.
MACHINE FOR STRIPPING PASTE OR STRAW BOARD BOXES.

No. 475,552. Patented May 24, 1892.

WITNESSES:  
J. F. Finch.  
A. S. Williamson.

INVENTOR  
Jonathan Godfrey  
BY F. W. Smith Jr.  
ATTORNEY (No Model.) 8 Sheets—Sheet 5.

J. GODFREY.
MACHINE FOR STRIPPING PASTE OR STRAW BOARD BOXES.

No. 475,552. Patented May 24, 1892.

WITNESSES:

INVENTOR
Jonathan Godfrey
BY
ATTORNEY (No Model.) 8 Sheets—Sheet 6.
J. GODFREY.
MACHINE FOR STRIPPING PASTE OR STRAW BOARD BOXES.
No. 475,552. Patented May 24, 1892.
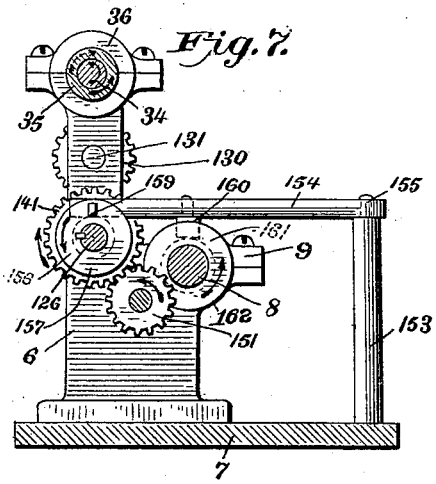
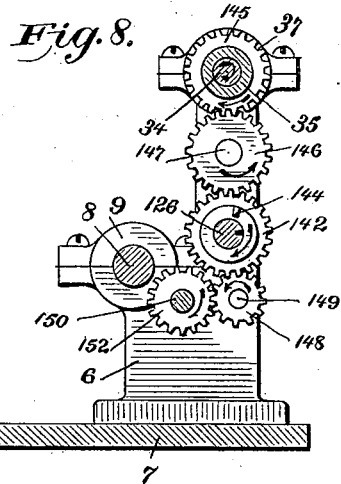
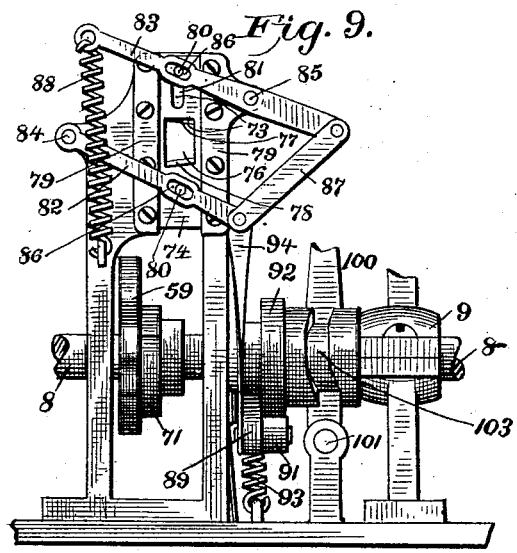
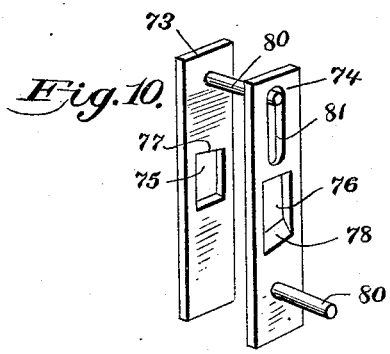
WITNESSES:
INVENTOR
Jonathan Godfrey
BY
ATTORNEY (No Model.) 8 Sheets—Sheet 7.

J. GODFREY.
MACHINE FOR STRIPPING PASTE OR STRAW BOARD BOXES.

No. 475,552. Patented May 24, 1892.

WITNESSES:

INVENTOR
Jonathan Godfrey
BY
ATTORNEY

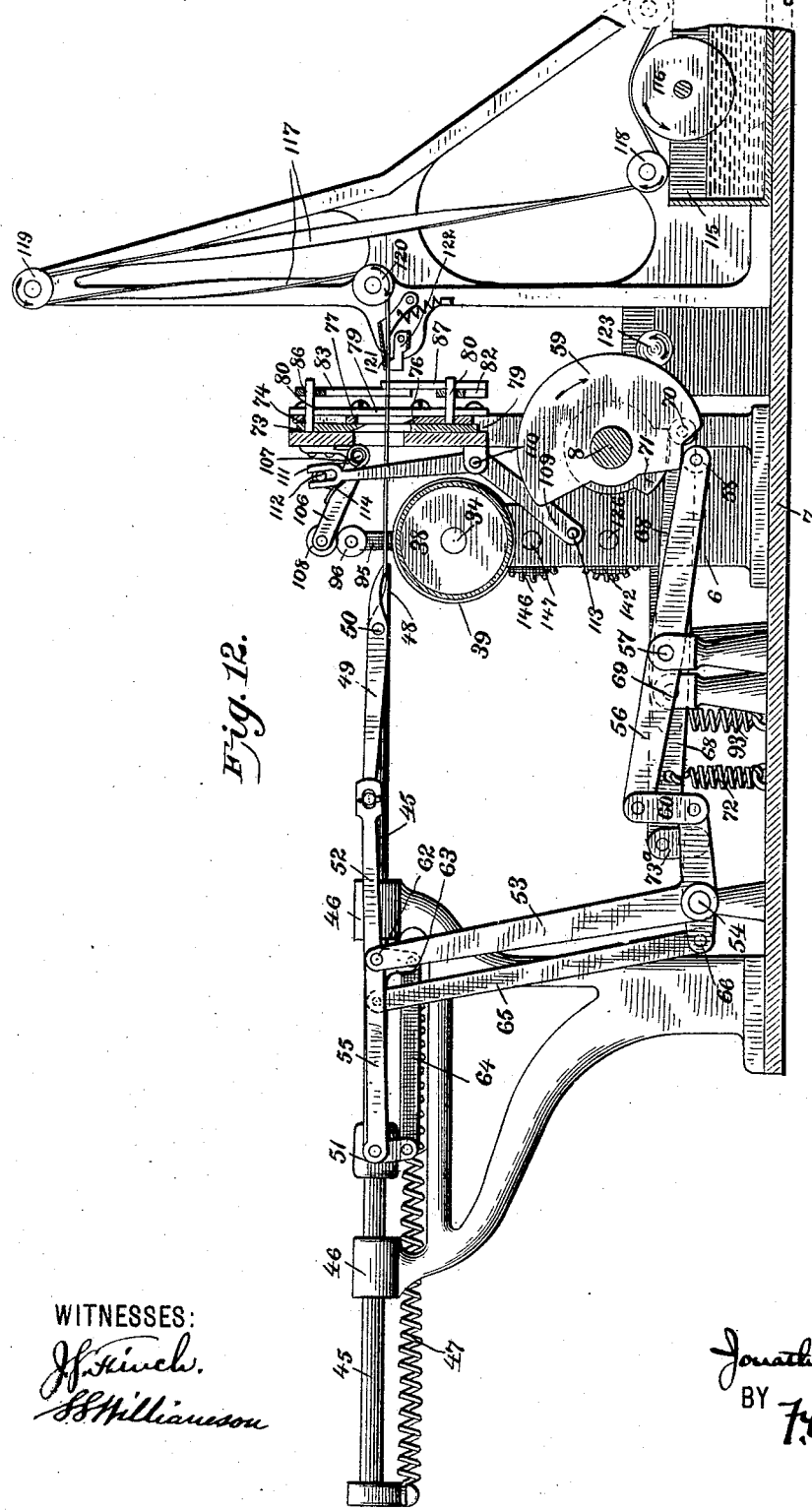

UNITED STATES PATENT OFFICE.

JONATHAN GODFREY, OF BRIDGEPORT, CONNECTICUT, ASSIGNOR OF ONE-HALF TO WILLIAM E. BAILLIE, OF SAME PLACE.

MACHINE FOR STRIPPING PASTE OR STRAW BOARD BOXES.

SPECIFICATION forming part of Letters Patent No. 475,552, dated May 24, 1892.

Application filed August 31, 1891. Serial No. 404,308. (No model.)

*To all whom it may concern:*

Be it known that I, JONATHAN GODFREY, a citizen of the United States, residing at Bridgeport, in the county of Fairfield and State of Connecticut, have invented a certain new and useful Improvement in Machines for Automatically Stripping Paste or Straw Board Boxes; and I do hereby declare the following to be a full, clear, and exact description of the invention, such as will enable others skilled in the art to which it appertains to make and use the same.

My invention relates to a certain new and useful improvement in machines for stripping paste or straw board boxes such as are commonly used for druggists' purposes, and has for its object to automatically encircle such boxes with a narrow strip of colored, ornamental, or plain paper, which strip has been previously coated with any desired paste or cement, and to secure said strip smoothly around the boxes.

With these ends in view my invention consists of certain automatically-operated appliances for delivering the boxes in proper position relative to the devices which control the application of the pasted strips of paper for applying said strips around said boxes, and finally for releasing the stripped boxes and allowing them to drop into any suitable receptacle.

Furthermore, my invention consists in certain details of construction and combination of elements, such as will be hereinafter fully set forth, and then specifically designated by the claims.

Figure 2:
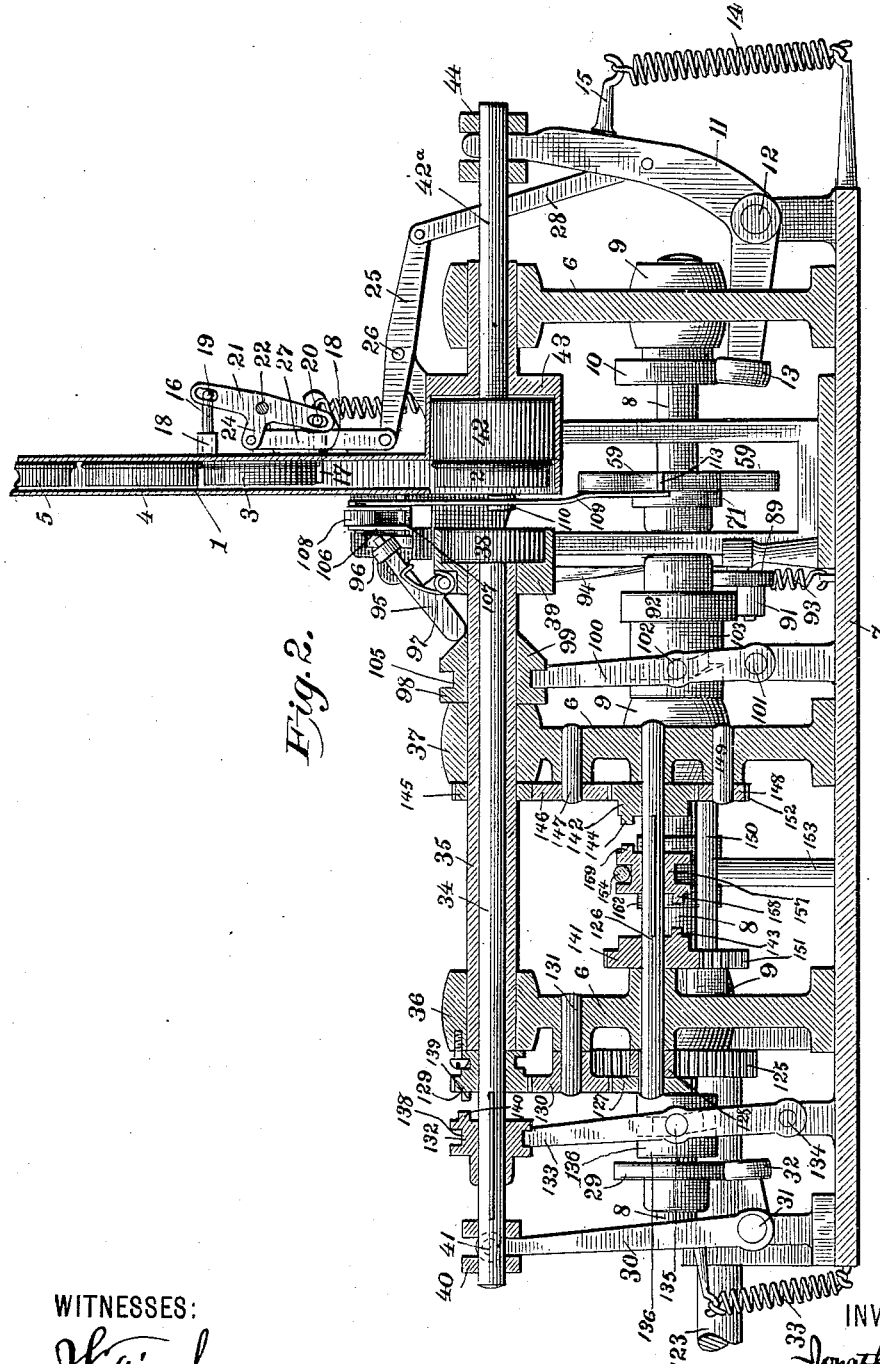
Figure 3:
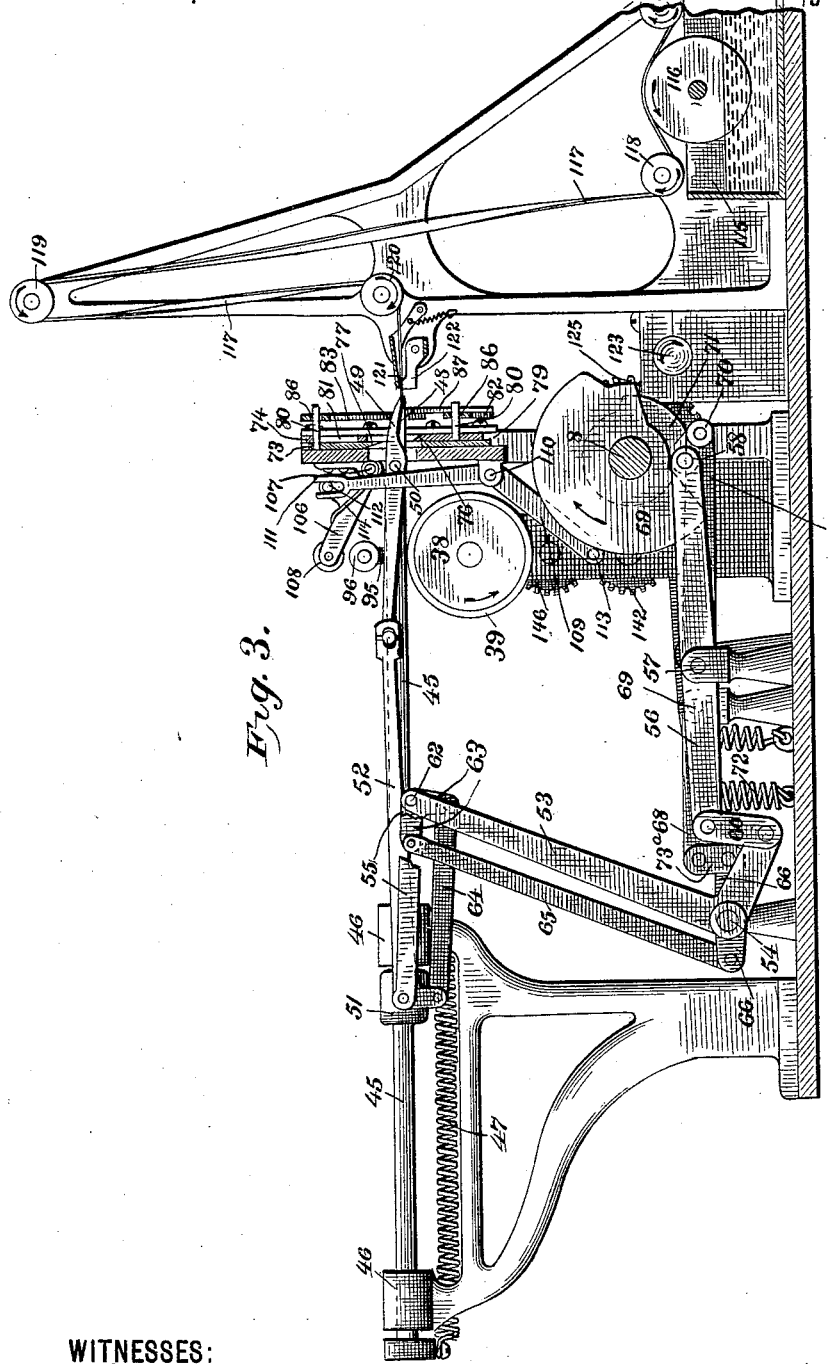
Figure 5:
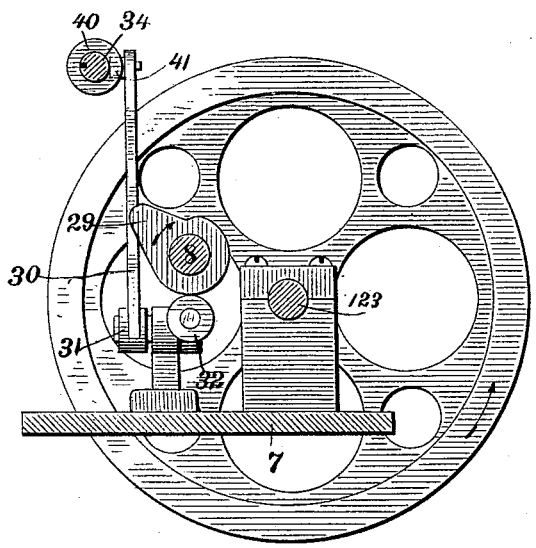
Figure 6:
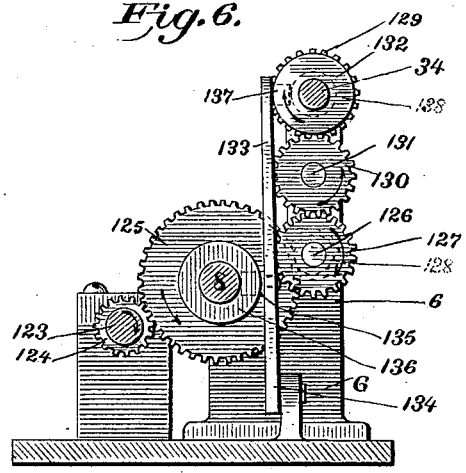
Figure 11:
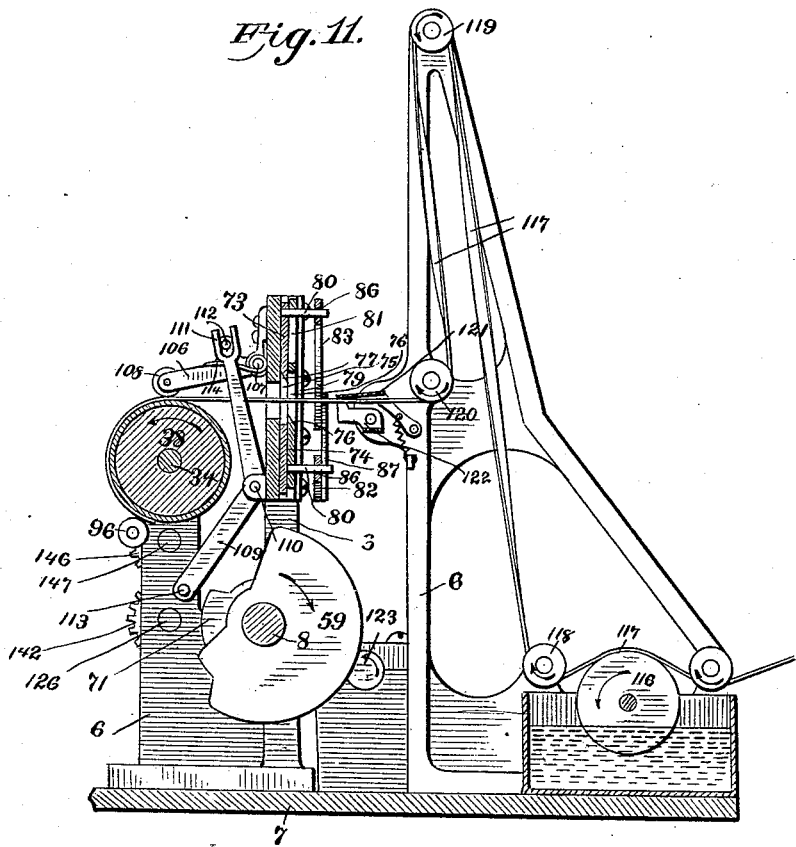

In the accompanying drawings, Figure 1 is a front elevation of my improvement with the devices for delivering the paper strip removed; Fig. 2, a vertical longitudinal sectional elevation; Fig. 3, a section at the line *i i*, Fig. 1, looking in the direction of the arrow *j;* Fig. 4, a section at the line *g g*, Fig. 1, looking in the direction of the arrow *h;* Fig. 5, a section at the line *a a*, Fig. 1, looking in the direction of the arrow *b;* Fig. 6, a section at the line *a a*, Fig. 1, looking in the direction of the arrow *c;* Fig. 7, a section at the line *d d*, Fig. 1, looking in the direction of the arrow *e;* Fig. 8, a section at the line *d d*, Fig. 1, looking in the direction of the arrow *f;* Fig. 9, a detail broken rear elevation showing the mechanism for operating the strip-cutters; Fig. 10, a detail perspective of the strip-cutters in proper relative position prior to their assembly in the machine; Fig. 11, a view similar to Fig. 3, but with the strip-delivering mechanism removed and showing the effective positions of the rolls for clamping and calendering the strip; Fig. 12, a view similar to Fig. 3, but showing the position of parts when the paper strip has been delivered by the pinchers in proper position relative to the box prior to the operation of the clamping-roll.

Similar numbers of reference denote like parts in the several figures of the drawings.

The machine for carrying out my invention comprises in its organization the following devices and mechanisms, all of which operate at predetermined times to effect the unitary result aimed at: first, devices for assembling the boxes in proper position preparatory to the presentation of the same to the strip-delivering devices; second, mechanism for presenting the boxes successively to the strip-delivering devices; third, devices for delivering the pasted strip to the boxes; fourth, devices for initially clamping said strip to the boxes and for subsequently calendering said strip thereon; fifth, mechanism for releasing said boxes when stripped and allowing them to fall into any suitable receptacle. The boxes and their covers are stripped separately, the strip being wrapped around their lateral circumferences.

My invention in part or parts may obviously be carried out by mechanism differing somewhat from that herein shown and described, especially as to details of construction. Some of these changes, which may be made without departing from the spirit and scope of my invention, will be mentioned herein, while others, more obvious, would be suggested to a skillful workman or one skilled in the art to which my invention relates simply by reading this specification and examining the drawings.

In order that a more perfect understanding of my invention may be had, I will now describe in detail the various mechanisms and devices which by their operation effect the result aimed at by my invention, reference being had by numbers to the accompanying drawings.

I will first describe the devices for properly assembling the boxes preparatory to the presentation of the same to the strip-delivering devices.

1 is a chute, within which the boxes are deposited by hand or by any suitable automatically-operated appliances. The boxes 2, 3, 4, and 5 within this chute are all similarly arranged, with their interiors toward the selecting-plunger, hereinafter to be described. The chute is secured to the frame 6 of the machine, which frame rises from the bed 7. 8 is a shaft journaled within bearings 9 in said frame, and 10 is a cam on said shaft.

11 is a bell-crank lever pivoted at 12 to the bed 7 and having at its lower end a friction-roll 13, which is kept in constant contact with said cam by the action of a coil-spring 14, whose ends are secured, respectively, to the bed 7 and a hook 15, extending from the upper leg of the lever 11.

16 17 are pins capable of a free movement within sockets 18, extending from the side wall of the chute. These pins are separated by a distance equal to the diameter of the boxes and are loosely connected at 19 20 to opposite ends of the link 21, which latter is pivoted at 22 midway of its length to a bracket 23, extending from the wall of the chute. 24 is a lug extending from said link at a point about opposite to the pivot 22.

25 is a rocker-arm pivoted at 26 to the frame and having its free ends connected, respectively, with the lug 24 and the upper leg of the bell-crank 11 by the levers 27 28, the ends of the latter being provided with pivoted connection in all instances.

From the foregoing it will be obvious that the action of the cam 10 and spring 14 on the bell-crank 11 will effect the rocking movements of the link 21, thereby alternately projecting the pins 16 17 within the chute. When the parts are in the position shown at Fig. 2, the lower pin 17 will extend within the chute and uphold the column of boxes during the operation of stripping the lowermost box 2, and when the parts are in the position shown at Fig. 1 the lower pin 17 will have been withdrawn to allow the succeeding box 3 to drop into position at the bottom of the chute and the pin 16 will have been simultaneously projected within the chute to uphold the column of boxes therein. The function, therefore, of the pins 16 17 and their operating mechanism is to supply the boxes one at a time to the devices which present the boxes to the stripping mechanism.

I will now describe the mechanism which operates to present the boxes successively to the strip-delivering devices.

29 is a cam on the shaft 8, and 30 is a bell-crank lever pivoted at 31 to the bed 7 and having at its lower end a friction-roll 32, which is kept in constant contact with said cam by the action of a coil-spring 33, whose ends are secured, respectively, to the bed and to the upper leg of the bell-crank 30.

34 is a shaft journaled within a hollow spindle 35, which latter is in turn journaled within boxes 36 37 in the frame. The shaft 34 has, in addition to a rotary movement, a free lengthwise play within the spindle 35, and on the inner end of this shaft is a circular plunger-block 38, which is normally housed within a casing 39 rigid on the inner end of the spindle. This block is immediately opposite the lower end of the chute, and is adapted to snugly fit within the interior of the boxes, and when projected in the manner presently set forth said block will enter the box which is lowermost in the chute.

40 is an ordinary double collar secured on the outer end of the shaft 34, and within this collar extends a friction-roll 41, carried by the upper end of the bell-crank 30.

From the foregoing it will be obvious that the action of the cam 29 and spring 33 will effect the reciprocation of the shaft 34 within the spindle 35, whereby the block 38 will be plunged within the lowermost box in the chute and then retracted in order to present said box to the strip-delivering devices, as will be presently set forth. The shape of this cam 29 is such (see Fig. 5) that there is a "dwell" throughout about one-half of its rotation, during which time the bell-crank 30, and consequently the shaft 34, remains stationary. This dwell is so timed that it will occur when the block 38, with a box thereon, has been retracted to a position half-way between the limits of its to-and-fro movements, and during this dwell the stripping of the box will be accomplished. The retraction of the block 38 within the casing 39 will cast off the stripped box, and the latter will drop within any suitable and convenient receptacle.

42 is a follower-block on the inner end of the sliding shaft 42$^a$ and housed within an extension 43 of the chute, and 44 is a double collar secured on this shaft, within which collar the upper end of the bell-crank 11 extends, the timing of the cams 10 and 29 being such that the block 42 will be projected simultaneously with the retraction of the block 38 from the chute, whereby the box will be clamped between said blocks to prevent any accidental slipping of the box around the block 38 during the stripping operation.

I have heretofore described the means whereby the boxes are successively fed and presented in proper position preparatory to the stripping, and I will now proceed to describe the devices whereby the paper strip is delivered to the boxes, initially clamped thereto, and finally encircled around the same.

Referring particularly to Figs. 3, 4, and 12, 45 is a spindle adapted to slide freely in bearings 46 in the frame, and 47 is a coil-spring, whose ends are secured to the frame and to the spindle, the function of said spring being to normally throw said spindle over the plunger-block 38, as shown at Fig. 3. The forward end of the spindle is so shaped as to form a stationary jaw 48, while an upper jaw 49 is pivoted at 50 to the spindle, said jaws constituting pinchers whereby the paper strip may be seized, as will be presently set forth. 51 is a collar rigid on the spindle, to which collar is pivoted an L-shaped lever 52, to the forward end of which latter the heel of the jaw 49 is pivoted, so that it will be readily understood that the rocking of said lever on its pivotal point will effect the opening and closing of the jaw 49. 53 is a bell-crank lever pivoted at 54 to the bed, the upper leg of said lever being pivoted at 62 to one end of a link 55, the other end of the latter being pivoted to the collar 51. 56 is a lever pivoted at 57 to the bed, one end of said lever carrying a friction-roll 58, which bears against the cam 59 on the shaft 8, while the other end of said lever is connected with the lower leg of the bell-crank 53 by a jog-link 60. It will be obvious, therefore, that the effective action of this cam 59 will swing the bell-crank 53 rearward to retract the spindle against the resiliency of the spring 47. 63 is a short bell-crank lever pivoted at 62, the lower leg whereof is pivotally connected by the link 64 to the lower leg of the lever 52, while the upper leg of this lever 63 is pivotally connected by a link 65 to a rock-bar 66, which latter is pivoted at 67 to the bed.

68 is a lever pivoted to the bed at 69 and carrying at one end a friction-roll 70, which is maintained in constant contact with the cam 71 on the shaft 8 by means of the coil-spring 72, whose ends are secured to the bed and to said lever. This lever 68 is pivotally connected to the rock-bar 66 by a jog-link 73ª.

From the foregoing it will be obvious that the combined action of the cam 71 and spring 72 will operate the lever 52 to effect the opening and closing of the jaw 49.

The devices for cutting the strips comprise two plates 73 74, having central openings 75 76 to admit the pinchers which grasp the paper, the opposite horizontal walls of said openings being provided with shear edges 77 78. (See Figs. 10 and 11.) These plates are confined in suitable ways 79 in the frame and are adapted to slide against each other. Each plate has a stud 80 projecting therefrom, an elongated slot 81 being cut in the front plate 74, through which the stud from the rear plate extends.

82 83 are levers pivoted to the frame at the points 84 85, and the studs 80 extend within slots 86 in said levers. 87 is a link whose ends are pivoted to the respective ends of these levers, and 88 is a coil-spring secured to the frame and to the lever 83, by means of which the levers 82 83 are normally maintained in such position as will tend to keep the cutter-plates closed.

89 is a lever pivoted at 90 to the bed and having a friction-roll 91, which is constantly maintained against the cam 92 on the shaft 8 by a coil-spring 93, secured to the bed and to said lever. Pivoted to the end of this lever, which carries the roll 91, is a link 94, the upper end whereof is pivoted to the toggle-frame constituted by the levers 82 83 and link 87. It will be apparent from the foregoing that the action of this cam 92 will operate the toggle-frame to open or close the cutter-plates, as the case may be.

95 is a dog pivoted to the casing 39 and having journaled on its nose a roll 96, which is maintained in a normally-elevated position by the action of a spring 97, as seen at Fig. 2.

98 is a block around the spindle 35 and having a free sliding movement thereon. The inner face of said block is beveled down to form a cone 99, at the base of which the tail of the dog 95 rests in normal position, as shown at Fig. 2.

Figure 4:
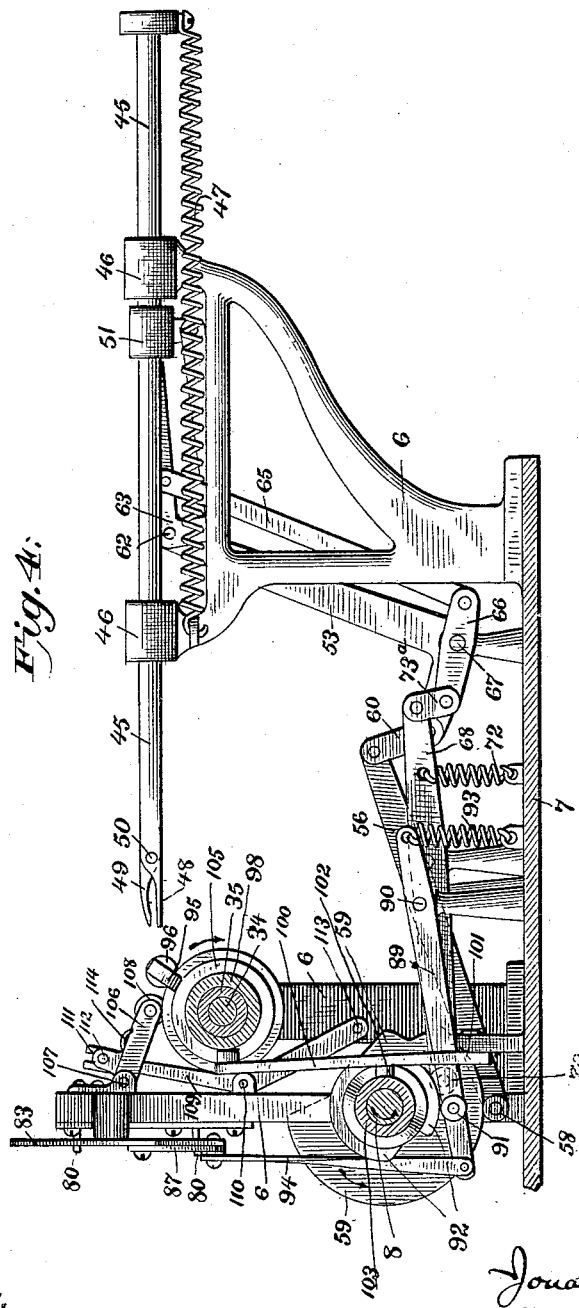

100 is a lever pivoted at 101 to the bed and having a stud 102, which extends within the groove of a cam 103 on the shaft 8, the action of said cam causing the lever to be swung forward and backward. This lever has a friction-roll 104, (shown in dotted lines at Fig. 1,) which extends within the annular groove 105 in the block 98, whereby a reciprocatory movement is imparted to said block from said lever. When the block is thrown inward, the cone 99 will force the tail of the dog 95 upward, thereby depressing the roll 96 against the delivered paper strip, as shown at Figs. 1 and 4, and as will presently be more in detail explained, and when said block is retracted the spring 97 will return the roll to its elevated position. (Shown at Fig. 2.)

106 is a dog pivoted at 107 to the frame and having a calender-roll 108 journaled in its nose.

109 is a lever pivoted at 110 to the frame and having at its upper extremity a fork 111, which is loosely engaged with a lateral projection 112 of said dog. At the lower end of this lever is a stud 113, which is maintained in engagement with the cam 59 by the action of the spring 114, which exerts a constant downward pressure against the dog 106. The effective action of this cam in this instance is to keep the dog normally elevated, while the spring 114 will, when the cam has ceased to perform its function, force the dog downward to bring the roll 108 firmly against the paper strip which has previously been superimposed upon the box. 115 is an ordinary paste-tub, and 116 a paste-roll, the lower part whereof is submerged in the liquid paste in the tub. The paper strip 117 is fed from a continuous roll (not shown) and is led over against the top of the paste-roll, and thence over and around suitable rolls 118, 119, and 120 between ordinary tension-jaws 121 122. The strip is twisted, as shown, in passing from the roll 118 to the tension-jaws, in order that the pasted surface may be presented intact to the boxes.

From the foregoing description it will be readily understood that the boxes are successively presented to the strip-delivering devices by the combined action of the cams 10 and 29; that the pasted strip of paper is delivered to the boxes by the combined action of the cams 59 and 71; that the cutting of the strip is controlled by the cam 92, and that the clamping and calendering rolls are controlled, respectively, by the cams 103 and 59. Therefore when the box and strip are in the relative positions shown at Fig. 1, and particularly at Fig. 12, the clamping-roll will be thrown against the strip by the action of the cam 103, and immediately thereafter, when the block 38 revolves, as will be presently described, the cam 59 will permit the calender-roll to be depressed against said strip, all of which will be clearly seen by reference to Figs. 12 and 4.

I will now describe the mechanism for revolving the boxes, whereby the strip may be wound and calendered thereon.

123 is the power-shaft, journaled in the frame and carrying a pinion 124, which meshes with a large gear 125 on the shaft 8, whereby the latter is constantly revolved at a slow rate of speed in order that the several cams carried thereby may be enabled to perform their functions at the proper times with respect to the quicker movements of some of the other parts of the machine.

126 is a shaft journaled within the frame and carrying gear 127 and pinion 128, which latter meshes with the gear 125, whereby power is communicated to said shaft.

129 is a gear loose on the shaft 34, and to which power is communicated from the gear 127 through the intermediate gear 130, which latter is mounted on a short shaft 131, journaled in the frame. It will thus be seen that the shaft 126 and gear 129 are constantly revolving.

132 is a collar splined on the shaft 34, so as to revolve therewith and have a lengthwise movement thereon.

133 is a lever pivoted at 134 to the bed and having a stud 135, which extends within the groove of a cam 136 on the shaft 8, the action of said cam being to vibrate said lever back and forth. The upper extremity of this lever is provided with a stud 137, as shown in dotted lines in Fig. 6, which extends within an annular groove 138 in the collar 132, whereby the latter may be thrown back and forth by the vibration of the lever 133.

The gear 129 and collar 132 have clutch-pins 139 140, respectively, whereby when said pins are engaged by the action of the cam 136 rotary motion will be communicated to the shaft 34 to revolve the block 38 and the box thereon. The timing of this cam is such that it will effect the retraction of the collar 132 after the devices hereinbefore described have operated in conjunction with the revolving block 38 to completely wind and calender the paper strip on the box.

I have deemed it advisable to hold the clamping-roll firmly against the paper strip throughout the revolution of the block 38, in order that said strip may become "set" to the box beyond all possibility of slipping, and I will now describe the means whereby said roll is carried bodily in its depressed condition in harmony with a part of revolution of the box and then returned to normal position. On the shaft 126 are the loose gears 141 142, which are provided with clutch-pins 143 144.

145 is a gear mounted on the spindle 35, and 146 is an intermediate gear on the short shaft 147, journaled in the frame and by which rotation is imparted from the gear 142 to the gear 145.

148 is a gear meshing with the gear 142 and mounted on short shaft 149, journaled in the frame.

150 is a shaft journaled in the frame and carrying gears 151 152, which mesh, respectively, with the gears 141 148. It will thus be seen that all the gears 141, 142, 145, 146, 148, 151, and 152 are in one train.

Referring to Figs. 2 and 7, 153 is a post rising from the bed, and 154 a lever pivoted thereto at 155, so as to be capable of a horizontal vibration. The forward end of this lever extends within an annular groove 156 in a block 157, which latter is splined on the shaft 126 and is provided with clutch-pins 158 159 on each side. 160 is a friction-roll extending from the lever 154 within the groove 161 (shown in dotted lines in Fig. 7 and in solid lines in Fig. 2) in the cam 162, which latter is carried by the shaft 8. The action of this cam 162 will cause the lever 154 to swing to and fro, and thereby slide the block 157 so that its clutch-pins 158 159 will engage with the clutch-pins 143 144 on the gears 141 142. The block 157, revolving constantly, as it does, is the means whereby reverse rotary movements are imparted to the spindle 35 and casing 39, for it will be obvious that the alternate engagement of the block 157 with the gears 141 142 will effect the rotation of said spindle and block in opposite directions. The nature of the cam 162 is such that said block 157 will be engaged with the gears 141 142 throughout only a half-revolution each, whereby the casing 39 will be turned a half-revolution first in one direction and then in the other, thereby permitting the roll 96 to clamp the strip until the latter is firmly "set" to the box, as will be clear by reference to Fig. 11.

The operation of my improvement is as follows: The boxes are successively withdrawn from the chute by the plunger-block 38 and held in the position shown at Fig. 1 until the spindle 45 and jaw 49 have been operated to seize the paper strip and present the same above the box in the position shown at Fig.

12. The cam 103 now operates to cause the roll 96 to clamp the strip, and immediately thereafter the cams 136, 162, and 59 operate to effect the revolution of the shaft 34 and spindle 35 and to cause the roll 108 to be depressed against the paper strip in the immediate rear of the roll 96, as clearly shown at Fig. 4. The depression of the dog 106 by the spring 114 throws the roll 108 down on top of the roll 96, where it remains momentarily until the latter roll has been carried downward by the revolution of the casing 39. In other words, the descent of the roll 108 is arrested by the roll 96 until the latter has started to perform its function. When the block 38 and casing 39 have completed about a half-revolution and the roll 96 has been carried to the position shown at Fig. 11, the cam 162 will operate to reverse the movement of said spindle and casing and to return the same, together with said roll, to normal position. The shears now operate to cut the strip, and the calender-roll 108 firmly unites the strip to the box during the continued revolution of the block 38. When a box has been stripped, the cams 103 and 59 operate to release the rolls 96 and 108, and the block 38 is withdrawn into the casing 39, thereby allowing the stripped box to drop into any suitable receptacle, in the manner hereinbefore set forth. The various cams are all timed to perform their functions properly and at predetermined moments.

The follower-block 42 and the devices for automatically presenting the boxes one by one to the plunger-block 38 may be omitted without departing from the spirit of my invention, since the latter block may be adapted to closely conform to the interior of the boxes, so that the latter will not slip during the stripping operation, and also the boxes may be fed into the chute by hand. Moreover, various contrivances, all within the range of ordinary mechanical skill, may be utilized for the purpose of grasping the boxes and delivering them to the stripping devices; but in all instances the boxes must be grasped and separated from succeeding boxes by active instrumentalities, which latter must then present them to the stripping devices; also, the boxes must be so grasped that their lateral peripheries shall be free from any foreign contact—that is to say, the boxes must be grasped without any contact against the sides which are to be stripped. Nor do I wish to be limited to the use of both the clamping and calender rolls, since I have ascertained that fairly good results may be obtained by doing away with either of said rolls, although I prefer to use both rolls as a precaution against the curling or slipping of the paper strip during the revolution of the boxes.

The pasting mechanism shown is very ordinary, and other devices may readily be substituted therefor, either to paste the paper strip or to apply the paste directly to the boxes, the gist of my invention resting in the broad idea of automatically winding and calendering the strip around the boxes rather than in any special contrivances for applying the paste.

I have shown my invention applied in an organized machine for the purpose of stripping round boxes, since the latter are more generally used than rectangular boxes; but my invention is applicable for the stripping of boxes which are triangular, rectangular, oblong, or of any polygonal shape, it being merely necessary in these instances to so adapt the calender-roll that it will yield resiliently to the irregularities in the latter contour of the box during the revolution of the latter.

Having thus described my invention, what I claim as new, and desire to secure by Letters Patent, is—

1. In a machine for automatically stripping the sides of paper boxes, the combination of mechanism for feeding a mass of boxes in regular succession, active instrumentalities for grasping the boxes and separating them from succeeding boxes and for presenting the latter to the stripping devices, means for delivering the pasted strip to the boxes, and instrumentalities for winding said strip around the boxes, substantially as set forth.

2. In a machine for automatically stripping the sides of paper boxes, the combination of means, as a chute, for feeding the boxes, active instrumentalities for successively grasping said boxes without contact with said sides and conveying them separately to the proper position relative to the stripping devices, instrumentalities for delivering the strip to the boxes, instrumentalities for initially clamping the strip to the boxes, instrumentalities for revolving the boxes, and instrumentalities for depressing said strip against said boxes during their revolution, substantially as set forth.

3. In a machine of the character described, the combination of means for feeding the boxes, a reciprocatory and rotary plunger-block whereby the boxes are selected and delivered to the stripping devices, reciprocatory pinchers whereby the strip is delivered to the boxes, a clamping-roll for depressing the strip against the boxes, means for revolving said plunger-block, and a calender-roll whereby said strip is firmly united to the boxes, substantially as set forth.

4. In a machine for stripping paper boxes, the combination of means for feeding a mass of said boxes successively, a reciprocatory and rotary plunger whereby the boxes are selected and delivered to the stripping devices, and instrumentalities for securing a pasted paper strip around the sides of said boxes during the rotation of the latter, substantially as set forth.

5. In a machine of the character described, the combination, with the means for feeding the finished boxes, of the plunger-block, the casing wherein said block is normally housed, and means for projecting and retracting said block, whereby a box is selected and delivered to the stripping devices and then after the stripping is cast off from said block, substantially as shown and described.

6. The combination of the chute, means for feeding the boxes therein one at a time to the devices for selecting and delivering the boxes to the stripping devices, a plunger-block conforming closely to the interiors of the boxes, means for projecting and retracting said plunger, whereby a box is grasped and presented to the stripping devices, instrumentalities for delivering the strip to the box, means for initially clamping said strip to the box, means for revolving the plunger-block, whereby said strip is wound around the box, and means for calendering the strip throughout its length upon the box during the revolution thereof, substantially as shown and described.

7. In a machine for automatically stripping the sides of paper boxes, the combination, with the devices for delivering the paper strip, of active instrumentalities for successively selecting, grasping, and delivering the boxes separately in proper position relative to said strip, and appliances for securing the strip around said boxes with an intervening application of paste, substantially as set forth.

In testimony whereof I affix my signature in presence of two witnesses.

JONATHAN GODFREY.

Witnesses:
F. W. SMITH, Jr.,
S. S. WILLIAMSON.